(12) United States Patent
Yang et al.

(10) Patent No.: US 10,654,070 B2
(45) Date of Patent: *May 19, 2020

(54) METHOD FOR PREPARING A BARRIER FILM

(71) Applicant: LG CHEM, LTD., Seoul (KR)

(72) Inventors: Hee Wang Yang, Daejeon (KR); Jang Yeon Hwang, Daejeon (KR); Seong Hwan Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/750,815

(22) PCT Filed: Mar. 31, 2017

(86) PCT No.: PCT/KR2017/003575
§ 371 (c)(1),
(2) Date: Feb. 6, 2018

(87) PCT Pub. No.: WO2017/171489
PCT Pub. Date: Oct. 5, 2017

(65) Prior Publication Data
US 2018/0243789 A1      Aug. 30, 2018

(30) Foreign Application Priority Data

Mar. 31, 2016   (KR) .................. 10-2016-0039037

(51) Int. Cl.
*C08J 7/18*      (2006.01)
*B05D 3/14*      (2006.01)
(Continued)

(52) U.S. Cl.
CPC ............. *B05D 3/148* (2013.01); *B05D 3/147* (2013.01); *B05D 7/04* (2013.01); *B05D 7/26* (2013.01);
(Continued)

(58) Field of Classification Search
CPC ..... C23C 18/14; C23C 16/308; C23C 16/345; C23C 16/401; C23C 16/402; H01J 37/00;
(Continued)

(56) References Cited

U.S. PATENT DOCUMENTS 5,358,739 A * 10/1994 Baney ................... H01L 21/316
                                                                257/E21.271
6,190,788 B1    2/2001 Shibuya et al.
(Continued)

FOREIGN PATENT DOCUMENTS

CN        102470637       5/2012
CN        103998230       8/2014
(Continued)

OTHER PUBLICATIONS

Z. Li et al.; Derwent abstract (Acc-No. 2017-11170L) of CN 106366337 A; published Feb. 1, 2017.*
(Continued)

*Primary Examiner* — Marianne L Padgett
(74) *Attorney, Agent, or Firm* — Dentons US LLP (57) ABSTRACT

The present application relates to a method for preparing a barrier film. The present application can provide a method for preparing a barrier film having excellent barrier characteristics and optical performances. The barrier film produced by the method of the present application can be effectively used not only for packaging materials of as foods or medicines, and the like, but also for various applications, such as members for FPDs (flat panel displays) such as LCDs (Liquid Crystal Displays) or solar cells, substrates for electronic papers or OLEDs (Organic Light Emitting Diodes), or sealing films.

11 Claims, 3 Drawing Sheets

(51) Int. Cl.

| | | |
|---|---|---|
| *B32B 38/00* | (2006.01) | |
| *C08J 7/12* | (2006.01) | |
| *B32B 27/08* | (2006.01) | |
| *B32B 27/28* | (2006.01) | |
| *B32B 27/18* | (2006.01) | |
| *B32B 7/02* | (2019.01) | |
| *B05D 7/04* | (2006.01) | |
| *B05D 7/26* | (2006.01) | |
| *B05D 7/00* | (2006.01) | |
| *C08J 7/04* | (2020.01) | |

(52) U.S. Cl.
CPC ............... *B05D 7/54* (2013.01); *B32B 7/02* (2013.01); *B32B 27/08* (2013.01); *B32B 27/18* (2013.01); *B32B 27/28* (2013.01); *B32B 38/0008* (2013.01); *C08J 7/042* (2013.01); *C08J 7/123* (2013.01); *B32B 2457/12* (2013.01); *B32B 2457/20* (2013.01); *C08J 2367/02* (2013.01); *C08J 2433/04* (2013.01); *C08J 2435/02* (2013.01); *C08J 2483/16* (2013.01)

(58) Field of Classification Search
CPC ........... H01J 2237/332; H01J 2237/336; H01J 2237/3365; H01J 2237/338; H01J 2237/3382; B05D 1/62; B05D 3/0406; B05D 3/046; B05D 3/145; B05D 3/147; B05D 3/148; B05D 7/04; B05D 7/26; B32B 27/08; B32B 27/18; B32B 27/26; B32B 38/0008; C08J 7/123; C08J 7/18; C08J 2483/00; C08J 2483/16
USPC ........ 427/489, 491, 535, 536, 539, 578, 579
See application file for complete search history.

(56) References Cited

U.S. PATENT DOCUMENTS

| | | | | |
|---|---|---|---|---|
| 6,501,014 B1* | 12/2002 | Kubota | ............... | H01L 31/048 136/251 |
| 9,994,732 B1* | 6/2018 | Johnson | ............... | C09D 183/16 |
| 2007/0093076 A1* | 4/2007 | Mikhael | ............... | B05D 1/60 438/780 |
| 2010/0148301 A1* | 6/2010 | Matsuda | ............... | C23C 16/308 257/510 |
| 2011/0146568 A1* | 6/2011 | Haukka | ............ | C23C 16/45555 118/200 |
| 2012/0107607 A1 | 5/2012 | Takaki et al. | | |
| 2012/0241889 A1* | 9/2012 | Takemura | ............ | H01L 51/448 257/431 |
| 2013/0115423 A1* | 5/2013 | Ii | ............... | B05D 5/00 428/141 |
| 2014/0322510 A1 | 10/2014 | Nishio | | |
| 2015/0030829 A1* | 1/2015 | Kenmochi | ............. | B32B 27/30 428/212 |
| 2015/0104636 A1* | 4/2015 | Takemura | ............... | H01B 1/02 428/336 |
| 2015/0166751 A1 | 6/2015 | Fukumoto et al. | | |
| 2015/0291813 A1 | 10/2015 | Nishio | | |
| 2017/0288170 A1* | 10/2017 | Ito | ............... | H01L 51/5253 |
| 2018/0072571 A1* | 3/2018 | Sanchez | ............... | C01B 21/087 |
| 2019/0106595 A1* | 4/2019 | Shin | ............... | C08L 83/08 |

FOREIGN PATENT DOCUMENTS

| | | | | |
|---|---|---|---|---|
| CN | 104379340 | | 2/2015 | |
| CN | 104736335 | | 6/2015 | |
| EP | 0675537 A2 | * | 10/1995 | ........ C04B 35/62222 |
| JP | 10-194873 A | | 7/1998 | |
| JP | 2000-246830 A | * | 9/2000 | ............ C23C 14/12 |
| JP | 2007-237588 A | * | 9/2007 | |
| JP | 2014-237317 | | 12/2014 | |
| KR | 10-2000-0006436 | | 1/2000 | |
| KR | 10-20110080810 | | 7/2011 | |
| KR | 10-2012-0031228 | | 3/2012 | |
| KR | 10-2014-0036049 | | 3/2014 | |
| TW | 412777 | | 11/2000 | |
| WO | WO-2017171488 A1 | * | 10/2017 | ............. C08L 83/08 |

OTHER PUBLICATIONS

International Search Report and the Written Opinion of PCT/KR2017/003575, dated Jul. 7, 2017, Written opinion considered to the extent that it is in Korean & no English translation has been provided; so cannot be read.
Office Action of Chinese Patent Office in Appl'n No. 201780003016 dated Apr. 18, 2019.
Office Action of Korean Patent Office in Appl'n No. 10-2017-0041829, dated Apr. 5, 2019.

* cited by examiner

METHOD FOR PREPARING A BARRIER FILM

This application is a National Stage Application of International Application No. PCT/KR2017/003575 filed on Mar. 31, 2017, which claims priority to and the benefit of Korean Patent Application No. 10-2016-0039037 filed on Mar. 31, 2016, both of which are incorporated herein in their entirety by reference for all purposes as if fully set forth herein.

TECHNICAL FIELD

The present application claims the benefit of priority based on Korean Patent Application No. 10-2016-0039037 filed on Mar. 31, 2016, the disclosure of which is incorporated herein by reference in its entirety.

The present application relates to a method for preparing a barrier film.

BACKGROUND ART

Barrier films for blocking external components such as oxygen and moisture are used not only for packaging materials of foods or medicines, and the like which are conventional main applications, but also members for FPDs (flat panel displays) such as LCDs (Liquid Crystal Displays) or solar cells, substrates for electronic papers or OLEDs (Organic Light Emitting Diodes) or sealing films, and the like.

In the applications, high barrier characteristics are required, and from the viewpoint of performance guarantee, moisture-heat resistance, in which the barrier characteristics are not lowered even after being left under moisture and heat conditions, and the like are also required.

As one of methods for preparing barrier films by a wet method, there is known a method of converting a polysilazane layer coated on a base material film to silica. In this method, the polysilazane can be converted to silica by being heat-treated in the presence of oxygen or water vapor, or through hydrolysis or dehydration polycondensation.

For example, in Patent Document 1, a method is described, in which perhydropolysilazane or a modified product thereof is applied to a base material film and calcined under vacuum.

PRIOR ART DOCUMENT

[Patent Document]
(Patent Document 1) Japanese Unexamined Patent Publication No. H10-194873

DISCLOSURE

Technical Problem

The present application provides a method for preparing a barrier film.

Technical Solution

The present application relates to a barrier film and a manufacturing method thereof. The present application may provide a manufacturing method capable of preparing a barrier film having excellent optical properties and barrier characteristics in a short time while preventing problems such as occurrence of scratches that may occur upon manufacturing processes, and a barrier film thus produced.

The present application relates to a method for forming a barrier layer, which may provide a barrier film capable of effectively overcoming a hardening rate problem and a barrier characteristic securing problem that may occur when a barrier layer is formed using a wet coating process by adopting a plasma hardening treatment method.

The present application can also achieve uniform oxidation rate of polysilazane in the thickness direction of the barrier layer by introducing an amine catalyst into the composition forming the barrier layer and performing the plasma treatment while injecting steam, and ultimately provide a barrier film having excellent barrier characteristics.

The barrier film of the present application may basically comprise a base layer and a barrier layer formed thereon and, if necessary, may further comprise an undercoating layer between the base layer and the barrier layer and/or a surface layer on top of the barrier layer. The barrier film may have a water vapor transmission rate (WVTR), evaluated under 30° C. and 100% relative humidity, of 10 mg/m$^2$/day or less, 9 mg/m$^2$/day or less or less, 8 mg/m$^2$/day or less, 7 mg/m$^2$/day or less, 6 mg/m$^2$/day or less, 5 mg/m$^2$/day or less, 4 mg/m$^2$/day or less, 3 mg/m$^2$/day or less, 2.5 mg/m$^2$/day or less, 2 mg/m$^2$/day or less, 1 mg/m$^2$/day or less, 0.95 mg/m$^2$/day or less, 0.93 mg/m$^2$/day or less, 0.9 mg/m$^2$/day or less, 0.5 mg/m$^2$/day or less, 0.3 mg/m$^2$/day or less, 0.1 mg/m$^2$/day or less, 0.01 mg/m$^2$/day or less, or 0.001 mg/m$^2$/day or less. As moisture permeability has a lower value, it means that the relevant layer represents more excellent barrier characteristics, and thus the lower limit of the moisture permeability is not particularly limited. The moisture permeability may be measured by, for example, ISO 15106-3 or ASTM F-1249 standard. For example, the water vapor transmission rate may be a value measured according to the manual using AQUATRAN 1 (Mocon) under 30° C. and 100% relative humidity.

The barrier layer may comprise polysilazane, and may satisfy Equation 1 below. In this specification, the term polysilazane may mean a generally known polysilazane, for example, a polymer in which silicon atoms and nitrogen atoms are repeated to form a basic backbone, or the polysilazane may be used as a meaning including a derivative of silicon oxide or silicon oxynitride, and the like having barrier characteristics formed by modification. Also, in the present application, the term modified polysilazane layer may mean a layer comprising the polysilazane changed to a state having the barrier characteristics among polysilazanes of the above-mentioned range.

$$0.8 \leq b/(a+b) \leq 1.00 \qquad \text{[Equation 1]}$$

In Equation 1, a means the number of Si—N bond units existing in the region corresponding to ⅓ of the thickness of the barrier layer based on the side of the barrier layer contacting the undercoating layer or the side facing the base layer, and b means the number of Si—O bond units existing in the region corresponding to ⅓ of the thickness of the barrier layer based on the side of the barrier layer contacting the undercoating layer or the side facing the base layer.

The present application may provide a barrier film comprising a barrier layer having excellent barrier characteristics as well as fast hardening rate by forming the barrier layer with a wet coating process, but performing a plasma hardening treatment upon a curing process. In addition, the present application can achieve excellent oxidation rate of polysilazane not only on the surface of the barrier layer but also in the region close to the undercoating layer by performing the plasma hardening treatment in a state where water vapor is injected in a predetermined amount or more, and ultimately provide a barrier film having excellent barrier characteristics.

The water vapor transmission rate of the barrier film can be achieved by a plasma hardening process performed after the wet coating process of the barrier layer, specifically, a plasma hardening process performed in a state where water vapor is injected in a predetermined amount or more.

Figure 1:
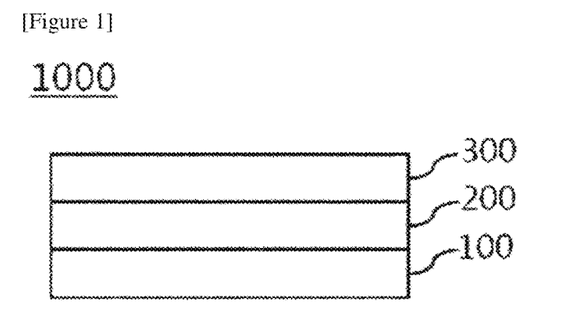
FIGS. 1 to 3 show the structure of a barrier film according to one embodiment of the present application.

FIG. 1 shows a structure of an exemplary barrier film. As shown in FIG. 1, the barrier film (1000) may have a structure comprising a base layer (100); an undercoating layer (200); and a barrier layer (300), which are sequentially formed on the base layer (100).

The type of the base layer included in the barrier film is not particularly limited, which may be a material having transparency and flexibility in view of characteristics of the barrier film, and for example, plastic base materials can be used.

In one example, as the base layer, one formed of polyolefin such as polyethylene or polypropylene; polyester such as polyethylene terephthalate or polyethylene naphthalate; cellulose such as triacetyl cellulose, diacetyl cellulose, propionyl cellulose, butyl cellulose or acetyl cellulose; polyamide such as 6-nylon or 6,6-nylon; an acrylic polymer such as polymethyl methacrylate; or an organic polymer such as polystyrene, polyvinyl chloride, polyimide, polyvinyl alcohol, polycarbonate or ethylene vinyl alcohol may be used, but is not limited thereto.

Also, the base layer may be one formed of one or a mixture of two or more or a polymer of the foregoing, or may be one having a structure in which a plurality of layers are laminated.

Specifically, the base layer of the present application may be a single layer or multilayer structure of two or more layers comprising at least one selected from the group consisting of polyolefin, polyester, cellulose, polyamide, an acrylic polymer and an organic polymer.

In addition, known additives, such as an antistatic agent, an ultraviolet absorber, an infrared absorber, a plasticizer, a lubricant, a colorant, an antioxidant or a flame retardant, can be included in the base layer.

In the present application, the thickness of the base layer is not particularly limited and may be suitably set as long as it can function as a barrier film. For example, the base layer may have a thickness in a range of about 1 μm to 500 μm, about 3 μm to 300 μm, about 5 μm to 250 μm, or about 10 μm to 200 μm or so. When the thickness of the base layer is adjusted to the above range, it is possible to maintain excellent electrical insulation, moisture barrier properties, mechanical properties and handling properties of the barrier film comprising the same.

The base layer may be, for example, one whose surface is modified. The surface modification is carried out in order to prevent a phenomenon such as falling off of a coating film due to a lack of adhesive force of a film upon coating a composition for forming a coating layer having barrier characteristics or a composition for forming a buffer layer, which is described below, and may be adopted by chemical treatment, corona discharge treatment, ultraviolet (UV) treatment, active plasma treatment or glow discharge treatment, and the like, but is not limited thereto.

In addition, the base layer may comprise known additives, for example, an antistatic agent, an ultraviolet absorber, an infrared absorber, a plasticizer, a lubricant, a colorant, an antioxidant or a flame retardant, and the like.

The base layer may have, for example, a refractive index with respect to light having a wavelength of 550 nm in a range of 1.0 to 2.0. Within this range, the entire transparency of the barrier film can be ensured, and it can have such optical characteristics that can be applied to an electronic device.

The barrier film of the present application may comprise an undercoating layer formed on the base layer.

The undercoat layer is formed on the base layer and serves to impart surface smoothness, and for example, it may have a coefficient of static friction of 0.4 or less for a stainless steel substrate at a vertical load of 200 g.

As described above, by maintaining the coefficient of static friction for the stainless steel substrate at a vertical load of 200 g at 0.4 or less, it is possible to prevent damage or the like of the barrier layer in the manufacturing process of the barrier film.

The barrier film can be formed, for example, by a roll-to-roll process, where in this roll-to-roll process, the barrier layer formed on the undercoating layer may cause friction with the guide roll or the like due to high surface roughness of layers formed on the bottom surface, thereby causing a problem of film productivity such as deterioration of barrier performance due to occurrence of scratches.

However, the barrier film of the present application can overcome the above-described problem by forming an undercoating layer having a static friction coefficient of 0.4 or less on the base layer and forming a barrier layer on the undercoating layer.

The coefficient of static friction of the undercoating layer can be calculated from measurements of shearing force at the time when the undercoating layer moves by, for example, laminating the undercoating layer on a stainless steel substrate and then applying the shearing force to the undercoating layer under a vertical load of 200 g.

Another example of the coefficient of static friction may be 0.35 or less, 0.30 or less, 0.25 or less, or 0.2 or less. The low coefficient of static friction means that the surface of the undercoating layer is smooth, and thus the lower limit is not particularly limited, but may be 0.02 or more, or 0.05 or more, for example.

Also, the undercoating layer has transparency, which may be one having a transmittance of 70% or more or 80% or more with respect to light having a wavelength of 550 nm.

Such an undercoating layer may be, for example, an organic layer, an inorganic layer, or an organic-inorganic hybrid layer.

In one example, the undercoating layer may be an organic-inorganic hybrid layer comprising a binder and particles.

In a specific example, the undercoating layer may be an organic-inorganic hybrid layer comprising a binder and inorganic particles, organic particles, or organic-inorganic particles.

The binder contained in the undercoating layer may be, for example, an acrylic resin.

The acrylic resin may be one formed by optical or radical polymerization of, for example, a (meth) acrylate monomer and/or a (meth) acrylate oligomer. That is, the acrylic resin may comprise polymerized units of a (meth) acrylate monomer and/or a (meth) acrylate oligomer. In the present application, the term "polymerized unit" means a state in which the monomer is polymerized and included in a skeleton such as a main chain of a polymer formed by polymerizing a monomer. In the present application, the term "(meth) acrylate" means acrylate or methacrylate.

In the present application, the (meth)acrylate monomer may be, for example, a polyfunctional (meth)acrylate compound. The term "polyfunctional (meth)acrylate compound"

may mean a (meth)acrylate compound having two or more polymerizable functional groups.

In a specific example, the polyfunctional (meth)acrylate may be a difunctional acrylate compound such as ethylene glycol di(meth)acrylate, diethylene glycol di(meth)acrylate, butanediol (meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, acrylate neopentyl glycol di(meth)acrylate, ethoxylated neopentyl glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylated or hydroxypivalic acid neopentyl glycol di(meth)acrylate, or may also be a trifunctional acrylatate compound such as trimethylolpropane tri(meth)acrylate, ethoxylated trimethylolpropane tri(meth)acrylate, propoxylated trimethylolpropane tri(meth)acrylate, tris-2-hydroxyethylisocyanurate tri(meth)acrylate or glycerin tri(meth)acrylate, pentaerythritol tri(meth)acrylate, dipentaerythritol tri(meth)acrylate or ditrimethylol propane tri(meth)acrylate, or a trifucntional or more acrylate compound such as pentaerythritol tetra(meth)acrylate, ditrimethylolpropane tetra(meth)acrylate, dipentaerythritol tetra(meth)acrylate, dipentaerythritol penta(meth)acrylate, ditrimethylol propane penta(meth)acrylate, dipentaerythritol hexa(meth)acrylate or ditrimethylol propane hexa(meth)acrylate, and the like.

The (meth)acrylate oligomer may be exemplified by epoxy (meth)acrylate, urethane (meth)acrylate, polyester (meth)acrylate, polybutadiene (meth)acrylate, silicone (meth)acrylate or alkyl (met)acrylate, and the like, but is not limited thereto.

The acrylic resin may be one formed from polymerization of a composition comprising at least one of the (meth)acrylate monomer and the (meth)acrylate oligomer as described above.

The inorganic particles contained in the undercoating layer may be exemplified by, for example, at least one selected from the group consisting of silica particles, titanium particles, aluminum particles, antimony oxide particles, zinc oxide particles and zirconia particles, but is not limited thereto.

Such inorganic particles may have a particle diameter in a range of, for example, 5 nm to 250 nm or 15 nm to 200 nm. Within this range, the coefficient of static friction or surface roughness of the undercoating layer, and the like as described above can be achieved.

In addition, although the refractive index of the inorganic particles is not particularly limited, inorganic particles having a predetermined refractive index value may be adopted within a range that does not hinder the optical characteristics of the barrier film.

When the inorganic particles are included in the undercoating layer together with the acrylic resin, the weight ratio (inorganic particles/acrylic resin) of the inorganic particles and the acrylic resin may be in a range of 0.05 to 0.6 or 0.1 to 0.5, but is not limited thereto. Here, the weight of the acrylic resin may be one calculated on the basis of the total weight of the monomer or oligomer forming the acrylic resin.

As the organic particles contained in the undercoating layer, polymethacrylate particles or polystyrene particles may be used, without being limited thereto, and various organic particles known in the technical field may be used.

When the acrylic resin and the organic particles are included in the undercoating layer, the weight ratio of the organic particles to the acrylic resin (organic particles/acrylic resin) may be in a range of 0.00005 to 0.01 or 0.0005 to 0.001, but is not limited thereto.

Such organic particles may have a particle diameter in a range of, for example, 0.5 to 3 times or 1 to 2 times relative to the thickness of the undercoating layer. Under these conditions, the desired coefficient of static friction and surface roughness value of the undercoating layer can be obtained.

For example, the organic particles may be such that the difference in the refractive index from the undercoating layer containing the organic particles is in a range of 0.1. Within this refractive index range, the physical properties required in the barrier film such as transparency can be achieved.

The organic-inorganic particles that can be included in the undercoating layer may be exemplified by, for example, inorganic particles surface-modified with organosilane, but are not limited thereto. To the organic-inorganic particles, all the conditions mentioned in the above-described organic particles may be applied.

The undercoating layer is formed on the base layer, and specifically, formed by coating the above-described composition for forming the undercoating layer on the base layer, followed by curing.

The barrier film of the present application comprises a barrier layer formed on the undercoating layer. Furthermore, the barrier layer comprises a polysilazane compound and satisfies Equation 1 below.

$$0.8 \leq b/(a+b) \leq 1.00 \qquad \text{[Equation 1]}$$

In Equation 1, a means the number of Si—N bond units existing in the region corresponding to ⅓ of the thickness of the barrier layer based on the side of the barrier layer contacting the undercoating layer or the side facing the base layer, and b means the number of Si—O bond units existing in the region corresponding to ⅓ of the thickness of the barrier layer based on the side of the barrier layer contacting the undercoating layer or the side facing the base layer.

In one example, the polysilazane in the barrier layer may comprise Si—O units formed by oxidation of Si—N units or the like.

The polysilazane can be, for example, polysilazane comprising Formula 1 below or a compound derived therefrom.

[Formula 1]

In Formula 1, each of $R^1$, $R^2$, and $R^3$ is hydrogen or an alkyl group, an alkenyl group, an aryl group, a carbonyl group, a hydroxy group, or an alkoxy group.

In the present application, the term "alkyl group" may mean an alkyl group having 1 to 20 carbon atoms, 1 to 16 carbon atoms, 1 to 12 carbon atoms, 1 to 8 carbon atoms, or 1 to 4 carbon atoms, unless otherwise specified. The alkyl group may be linear, branched or cyclic. The alkyl group may be a linear or branched alkyl group such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group or an n-octyl group, or may be exemplified by a cycloalkyl group such as a cyclobutyl group, a cyclopentyl group, a cyclohexyl group or a cycloheptyl group. In addition, the alkyl group may be optionally substituted with one or more substituents.

In the present application, the term "alkenyl group" may mean an alkenyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl group may be linear, branched or cyclic. The alkenyl group may be exemplified by a vinyl group, a 1-propenyl group, a 2-propenyl group, a 1-butenyl group, a 2-butenyl group or a 3-butenyl group, and the like. Also, the alkenyl group may be optionally substituted with one or more substituents.

In the present application, the term "aryl group" may mean a monovalent residue derived from a compound containing a benzene ring or a structure in which two or more benzene rings are condensed or bonded, or a derivative thereof, unless otherwise specified. In the range of the aryl group, a so-called aralkyl group or arylalkyl group as well as a functional group typically called an aryl group may also be included. The aryl group may be, for example, an aryl group having 6 to 25 carbon atoms, 6 to 21 carbon atoms, 6 to 18 carbon atoms, or 6 to 12 carbon atoms. The aryl group may be exemplified by a phenyl group, a phenoxy group, a phenoxyphenyl group, a phenoxybenzyl group, dichlorophenyl, chlorophenyl, a phenylethyl group, a phenylpropyl group, a benzyl group, a tolyl group, axylyl group or a naphthyl group, and the like. In addition, the aryl group may be optionally substituted with one or more substituents.

In the present application, the term "alkoxy group" may mean an alkoxy group having 1 to 20 carbon atoms, 1 to 16 carbon atoms, 1 to 12 carbon atoms, 1 to 8 carbon atoms, or 1 to 4 carbon atoms, unless otherwise specified. The alkoxy group may be linear, branched or cyclic. In addition, the alkoxy group may be optionally substituted with one or more substituents.

In the present application, the substituent which may optionally be substituted in the alkyl group, alkylene group or aryl group or alkoxy group may be exemplified by halogen such as chlorine or fluorine, an epoxy group such as a glycidyl group, an epoxyalkyl group, a glycidoxyalkyl group or an alicyclic epoxy group, an acryloyl group, a methacryloyl group, an isocyanate group, a thiol group or a monovalent hydrocarbon group, and the like, but is not limited thereto. The term "monovalent hydrocarbon group" may mean a monovalent residue derived from a compound consisting of carbon and hydrogen or a derivative of such a compound, unless otherwise specified. For example, the monovalent hydrocarbon group may contain 1 to 25 carbon atoms. The monovalent hydrocarbon group may be exemplified by an alkyl group, an alkenyl group, an alkynyl group or an aryl group, and the like.

The polysilazane comprising Formula 1 may be, for example, perhydropolysilazane in which all the $R^1$ to $R^3$ are hydrogen atoms, or may also be an organopolysilazane in which at least one of the $R^1$ to $R^3$ is not a hydrogen atom.

In one example, the perhydropolysilazane may be a linear chain structure, a branched chain structure, or a cyclic structure having as a repeating unit a structure in which $R^1$ to $R^3$ in Formula 1 are all hydrogen atoms in the molecule.

The Si—N bond unit of the polysilazane comprising Formula 1 may be converted to a bond unit of Si—O when subjected to a oxidation process to be described below, specifically a curing process using plasma performed under injection of water vapor in a predetermined amount or more, and the barrier layer of the present application may be cured so as to satisfy Equation 1 above.

The fact that the barrier layer satisfies Equation 1 above may mean that even in a region of the barrier layer close to the undercoating layer, specifically, a region corresponding to ⅓ of the thickness of the barrier layer based on the side contacting the undercoating layer, the oxidation rate of polysilazane is in the range of 65% to 90%.

That is, the barrier layer of the present application is formed by comprising a conversion process of Si—N units into Si—O units which is induced by the oxidation of polysilazane to be described below, where the present application can have achieved a uniform polysilazane oxidation rate in the thickness direction of the barrier layer, and particularly, can have achieved an oxidation rate of 65% or more even in the inner region of the barrier layer, specifically, the region corresponding to ⅓ of the thickness of the barrier layer based on the side of the barrier layer contacting the undercoating layer, by adopting the plasma treatment method in a state where water vapor is injected in a predetermined amount or more among various processes oxidizing polysilazane.

In another example, the ratio (O/(O+N)) of the number of Si—N bond units (N) and the number of Si—O bond units (O) in a region corresponding to ⅓ of the thickness of the barrier layer based on the side of the barrier layer of the present application contacting the undercoating layer or the side facing the base layer, can be in a range of 0.68 to 0.88 or 0.70 to 0.85.

The barrier layer of the present application can also satisfy Equation 2 below.

$$0.75 \leq d/(c+d) \leq 0.97 \qquad [\text{Equation 2}]$$

In Equation 2, c means the number of Si—N bond units present in the barrier layer, and d means the number of Si—O bond units present in the barrier layer.

The Equation 2 means a conversion ratio of polysilazane in the entire region of the barrier layer, where it is possible to secure the desired barrier characteristics while imparting appropriate rigidity to the barrier layer by comprising the barrier layer satisfying Equation 2 above in the barrier film.

Also, the barrier layer may further comprise an amine catalyst.

The amine catalyst is added to appropriately control the hardening rate and degree of the barrier layer, and when the amine catalyst is added, the water vapor transmission rate (WVTR) of the barrier film can be reduced by about 20% or more over the barrier film without any amine catalyst. In addition, the barrier layer of the present application can achieve uniform oxidation rate of polysilazane in the thickness direction by comprising the amine catalyst and through the plasma hardening process, which is described below, performed in a state where water vapor is added in a predetermined amount or more, so that the barrier layer satisfying Equation 1 above can be provided.

In one example, the amine catalyst may be exemplified by ammonia, ammonium hydroxide, ammonium chloride, trialkylamine such as triethylamine, dialkylamine such as diethylamine, monoalkylamine such as monoethanolamine, dialkanolamine such as diethanolamine, dialkylalkanolamine such as dimethylethanolamine, trialkanolamine such as triethanolamine or dialkylaminoalkyl trialkoxysilane such as diethylaminopropyl trialkoxysilane, but is not limited thereto.

Here, the alkyl group or alkoxy group may be an alkyl group or alkoxy group having 1 to 20 carbon atoms, 1 to 16 carbon atoms, 1 to 12 carbon atoms, 1 to 8 carbon atoms, or 1 to 4 carbon atoms, and such an alkyl group or alkoxy group may be linear, branched or cyclic.

Also, the alkanol may be an alkanol having 1 to 20 carbon atoms, 1 to 16 carbon atoms, 1 to 12 carbon atoms, 1 to 8 carbon atoms or 1 to 4 carbon atoms, and the alkanol may be linear, branched or cyclic.

The amine catalyst may be contained in the barrier layer or a polysilazane layer to be described below in a range of 0.1 to 10 parts by weight relative to 100 parts by weight of polysilazane. In another example, the amine catalyst may be included in the barrier layer in an amount of 0.5 parts by weight or more or 0.8 parts by weight or more relative to 100 parts by weight of polysilazane. The amine catalyst may also be included in the barrier layer in an amount of 9 parts by weight or less, 8 parts by weight or less, 7 parts by weight or less, 6 parts by weight or less, 5 parts by weight or less, or about 4 parts by weight or less, relative to 100 parts by weight of polysilazane.

The barrier layer may further comprise inorganic particles. The inorganic particles serve to impart barrier characteristics in the barrier layer, whereby the effect of reducing the used amount of polysilazane can be obtained.

As the kind of the inorganic particles, inorganic particles contained in the above-mentioned undercoating layer may be used without limitation, and for example, at least one of silica particles, titanium particles, aluminum particles, antimony oxide particles, zinc oxide particles and zirconia particles may be exemplified, without being limited thereto.

In one example, the barrier layer may comprise inorganic particles in a range of 5 wt % to 30 wt %. In another example, the inorganic particles may be included in the barrier layer in the range of 7 wt % to 25 wt % or 10 wt % to 20 wt %.

Also, the barrier layer may further comprise an alkoxy metal compound such as a silane coupling agent for imparting appropriate rigidity to the barrier layer and for improving adhesiveness with the undercoating layer or the like.

The silane coupling agent may be included in the barrier layer in a range of 0.001 to 10 wt % or 0.005 to 5 wt %.

In addition to the above-described components, the barrier layer may further comprise known additives, for example, an antistatic agent, an oxidizing agent, an ultraviolet absorber, an infrared absorber, a plasticizer, a lubricant, a colorant or a flame retardant, and the like for securing the functional properties of the barrier layer and for improving the hardening rate, and the like.

The thickness of the barrier layer in the present application is not particularly limited, but if the thickness of the barrier layer is too thin, the desired barrier characteristics is not ensured, whereas if the thickness is too thick, there is a concern that damage such as cracks is caused due to contraction of the barrier layer or the like. Therefore, the thickness of the barrier layer may be selected at an appropriate level within a range of about 20 nm to 1,000 nm.

The barrier layer of the present application can be formed by a wet coating process, for example, a coating process of a composition for forming a barrier layer comprising polysilazane, a solvent and an amine catalyst, and other additives, and the like.

In one example, the barrier layer may be a coating layer of a composition for forming a barrier layer comprising polysilazane.

In the case where the barrier layer of the present application is a coating layer, a process for curing the same is involved, where the curing process in the present application may be adopted from a plasma treatment method performed in the state that water vapor is present, other than heat curing, UV curing or a plasma treatment method performed under injection of low water vapor.

In one example, the barrier layer may be a hardening layer plasma-treated with a water vapor pressure of 5% or more. In this specification, the water vapor pressure may mean the percentage of the injection flow rate of the injected water vapor, relative to the total flow rate of the gases injected into the processing space. For example, in the case of performing the plasma treatment while injecting water vapor, a discharge gas and a reaction gas into the chamber, which is a processing space, at flow rates of A sccm, B sccm and C sccm, respectively, the water vapor pressure can be calculated as $100 \times A/(A+B+C)$.

The thickness of the barrier layer of the present application is not particularly limited, but may be, for example, 5 nm to 5,000 nm. By adjusting the thickness of the barrier layer within the above range, it is possible to maintain excellent durability and weather resistance while improving barrier characteristics of the barrier layer. However, the thickness of the barrier layer is not limited to the above-mentioned range, and can be suitably adjusted as needed.

Figure 2:
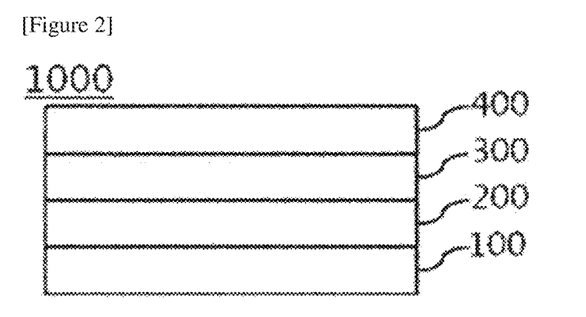

Also, the barrier film of the present application may further comprise a protective coating layer. That is, as shown in FIG. 2, the barrier film (1000) of the present application may have a structure comprising an undercoating layer (200), a barrier layer (300), and a protective coating layer (400) sequentially on a base layer (100).

Such a protective coating layer may comprise, for example, inorganic particles and the binder, which may be contained in the undercoating layer.

Also, the barrier film of the present application may further comprise an anti-blocking layer. The anti-blocking layer may be formed, for example, on the side opposite to the side of the base layer on which the undercoating layer is formed.

Figure 3:
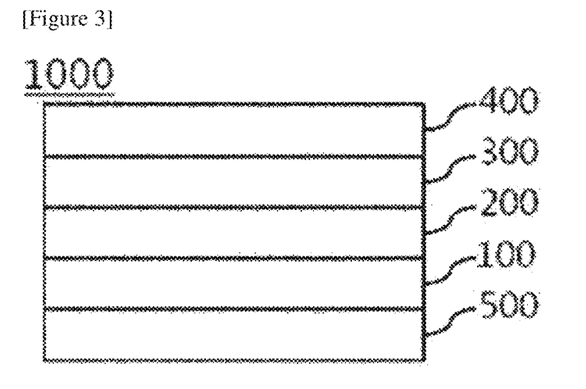

Specifically, as shown in FIG. 3, the barrier film (1000) of the present application may have a structure comprising an undercoating layer (200), a barrier layer (300) and a protective coating layer (400) sequentially on a base layer (100), and comprising an anti-blocking layer (500) formed on the side opposite to the side of the base layer (100) on which the undercoating layer (200) is formed.

The anti-blocking layer is a layer for improving blocking resistance, where the term "blocking resistance" means a property for improving handling property and winding property of the film by preventing the undercoating layer from sticking to each other.

The anti-blocking layer may be formed by coating a solution comprising, for example, polyethylene terephthalate, polyethylene naphthalate, polycarbonate, polyether sulfone, polyarylate, a cyclic olefin polymer, a norbornene resin, an acrylic resin or an epoxy resin, and the like, in which about 0.01 to 50 wt % of inorganic particles, organic particles or organic-inorganic particles are added, on one side of the base layer, and may also use a polyester film surface-roughened or the like.

The anti-blocking layer may have a predetermined aspect ratio of surface irregularities within a range in which the anti-blocking property can be ensured.

In one example, the anti-blocking layer may have an aspect ratio of surface irregularities measured within the range of 310 μm×232 μm in a range of 10 to 700 or 20 to 500. Within this range, the above-described winding property and handling property of the film can be improved.

The present application also relates to a method for preparing the barrier film. The method for preparing a barrier film may be a method for preparing a barrier film having the above-mentioned characteristics.

An exemplary preparation method may comprise a step of plasma-treating the polysilazane layer in the processing space to modify it. Here, the polysilazane layer is a layer formed by using the above-mentioned composition for forming a barrier layer, and thus may comprise at least polysilazane and an amine catalyst. The ratio of the amine catalyst in this polysilazane layer is as mentioned above.

The method for preparing a barrier film according to the present application may comprise a step of coating a composition for forming a barrier layer comprising polysilazane and an amine catalyst on a base layer or a base layer on which an undercoating layer is formed, followed by plasma-treatment.

The composition may further comprise a solvent upon the coating process. As the solvent, an organic solvent may be used, and the usable specific types may include hydrocarbon solvents such as aliphatic hydrocarbons, alicyclic hydrocarbons and aromatic hydrocarbons, halogenated hydrocarbon solvents, ethers such as aliphatic ethers and alicyclic ethers, and specifically, aliphatic hydrocarbons such as pentane, hexane, cyclohexane, toluene, xylene, solvesso and terpene; halogenated hydrocarbons such as methylene chloride and trichloroethane; esters such as ethyl acetate and butyl acetate; ketones such as acetone and methyl ethyl ketone; or aliphatic ethers such as dibutyl ether, dioxane and tetrahydrofuran, and the like may be exemplified.

The production method may comprise a step of plasma-treating the polysilazane layer in a processing space. The polysilazane layer may basically cmprise polysilazane and an amine catalyst, and if necessary, may further comprise one or more selected from the group consisting of the inorganic particles, the oxidizing agent, and the silane coupling agent.

The polysilazane layer may comprise polysilazane as a main component, and in this case, the main component may mean the case where the ratio of polysilazane in the relevant polysilazane layer is 55% or more, 60% or more, 65% or more, 70% or more, 75% or more, 80% or more, 85% or more, or 90% or more on the basis of weight. The weight ratio may be, for example, 100% or less, 99% or less, 98% or less, 97% or less, 96% or less, or 95% or less.

The content of the amine catalyst in the polysilazane layer is as described above.

The barrier film of the present application can secure the hardening rate and the superiority of barrier characteristics at the same time by adopting a plasma treatment method performed in the state that water vapor is present, other than heat curing, UV curing or a plasma treatment method performed under injection of low water vapor upon the hardening process of the barrier layer.

The inventors have confirmed that the modified polysilazane layer having significantly increased barrier characteristics is formed by introducing the amine catalyst and plasma-treating the polysilazane layer as above under the high temperature condition that water vapor is present. Generally, when the water vapor is present on forming the modified polysilazane having barrier characteristics by modifying the polysilazane, Si—OH is produced to lower the barrier characteristics of the modified polysilazane, and thus, considering that it is known to have to perform the modification treatment under a low oxygen and low water vapor atmosphere in order to form the polysilazane having barrier characteristics, the above finding is surprising. When the modification treatment is performed under the water vapor atmosphere, the reason why the barrier characteristics are increased is not clear, but it is predicted that the hydrogen radicals dissociated from the water vapor in the processing space detach hydrogen atoms of the polysilazane and bond to them to form hydrogen (H2), thereby increasing the reactivity of the polysilazane.

For example, the modification treatment of the polysilazane layer can be carried out in a state where water vapor is present in the processing space, for example, in a state of maintaining the vapor pressure of water vapor in the processing space at 5% or more. In another example, the water vapor pressure may be about 10% or more, about 15% or more, about 20% or more, about 25% or more, about 30% or more, about 35% or more, or about 40% or more. The upper limit of the water vapor pressure is not particularly limited and may be, for example, about 90% or less, about 85% or less, about 80% or less, about 75% or less, about 70% or less, about 65% or less, about 60% or less, about 55% or less, about 50% or less, about 45% or less, about 40% or less, or about 35% or less.

The manner of keeping the water vapor pressure in the processing space within the above-mentioned range is not particularly limited.

For example, the modification treatment can be performed while injecting water vapor, a discharge gas, and oxygen into the processing space, where the water vapor pressure can be controlled by controlling the injection flow rate. In an exemplary method, the modification treatment can be performed while injecting the water vapor at a flow rate of 50 sccm or more in the processing space. In another example, the injection flow rate of the water vapor may be 55 sccm or more, 60 sccm or more, 65 sccm or more, 70 sccm or more, 75 sccm or more, 80 sccm or more, 85 sccm or more, 90 sccm or more, 95 sccm or more, 100 sccm or more, 105 sccm or more, 110 sccm or more, 115 sccm or more, or 120 sccm or more. The upper limit of the injection flow rate is not particularly limited, and for example, the injection flow rate may be about 500 sccm or less, 400 sccm or less, 300 sccm or less, 200 sccm or less, or about 150 sccm or less.

The hydrogen partial pressure in the processing space can be controlled by maintaining the water vapor pressure as above in the processing space. As described above, the cause of increasing the barrier characteristics by the modification treatment under the water vapor atmosphere may include dehydrogenation of the polysilazane layer by the hydrogen radicals generated from the water vapor, whereby the hydrogen partial pressure in the processing space can be controlled. In one example, the partial pressure of hydrogen ($H_2$) in the processing space where the modification treatment is performed may be about $2.00 \times 10^{-5}$ Pa or more. The upper limit of the hydrogen partial pressure is not particularly limited and may be, for example, about $1.00 \times 10$ Pa or less, about $9.00 \times 10^{-5}$ Pa or less, about $8.00 \times 10^{-5}$ Pa or less, about $7.00 \times 10^{-5}$ Pa or less, about $6.00 \times 10^{-5}$ Pa or less, about $5.00 \times 10^{-5}$ Pa or less, or about $4.50 \times 10^{-5}$ Pa or less. This hydrogen partial pressure can be achieved through controlling the partial pressure of water vapor or the injection flow rate in the processing space, and in this range, a barrier film having excellent barrier characteristics can be obtained.

Under the conditions as above, a modification treatment, that is, a plasma treatment may be performed to modify the polysilazane and to form a barrier layer.

Here, the plasma treatment may be carried out by performing a plasma discharge treatment while supplying a discharge gas capable of forming a plasma state. Here, as the applicable discharge gas, nitrogen gas and/or the atom of Group 18 of the periodic table, for example, helium, neon, argon, krypton, xenon or radon, and the like can be used.

Accordingly, when the modification treatment is a plasma treatment, the modification treatment can be performed while injecting a discharge gas and water vapor into the processing space. As the discharge gas, the above-mentioned kind may be used.

When the discharge gas is injected, the ratio (H/A) of the injection flow rate (H) of the water vapor to the injection flow rate (A) of the discharge gas may be maintained at 0.4 or more. In another example, the ratio (H/A) may be maintained at about 0.45 or more or about 0.5 or more. The upper limit of the ratio (H/A) is not particularly limited and may be, for example, about 10 or less, about 9 or less, about 8 or less, about 7 or less, about 6 or less, about 5 or less, about 4 or less, about 3 or less, about 2 or less, about 1 or less, or about 0.9 or less. Under such a range, the modification treatment can be effectively performed.

The modification treatment can be performed while supplying oxygen having oxidation characteristics as a reaction gas into the processing space. Therefore, the modification treatment can be performed while injecting water vapor and oxygen into the processing space. In this case, the ratio (H/O) of the injection flow rate (H) of the water vapor to the injection flow rate (0) of the oxygen gas into the processing space may be about 0.4 or more. In another example, the ratio (H/0) may be maintained at about 0.45 or more or about 0.5 or more. The upper limit of the ratio (H/O) is not particularly limited and may be, for example, about 10 or less, about 9 or less, about 8 or less, about 7 or less, about 6 or less, about 5 or less, about 4 or less, about 3 or less, about 2 or less, about 1 or less, or about 0.9 or less. Under such a range, the modification treatment can be effectively performed.

The discharge condition for the modification treatment, that is, the plasma treatment, performed while injecting the water vapor, the discharge gas and/or the reaction gas as described above is not particularly limited and may be selected in consideration of the process efficiency or the like or the kinds and flow rates of the gases to be injected. For example, the plasma discharge treatment may be performed with an applied power of about 500 W or more. In another example, the applied power may be about 600 W or more, about 700 W or more, about 800 W or more, about 900 W or more, or about 1000 W or more. The applied power may be about 2000 W or less, about 1500 W or less, or about 1300 W or less.

In another example, the plasma discharge treatment may be performed such that a power density per unit area of an electrode is about 0.2 $W/cm^2$ or more. In another example, the power density may be about 0.4 $W/cm^2$ or more, about 0.6 $W/cm^2$ or more, about 0.8 $W/cm^2$ or more, or about 0.9 $W/cm^2$ or more. In addition, the power density may be about 5 $W/cm^2$ or less, 4 $W/cm^2$ or less, 3 $W/cm^2$ or less, 2 $W/cm^2$ or 1.5 $W/cm^2$ or less.

However, the range of the power density and the power is exemplary and the specific range can be determined depending on the desired processing energy and the composition of the barrier film to be processed, for example, the type of the base material film of the barrier film. That is, since the processing energy is determined by the product of the power density and the processing time, the power density is increased in order to secure the desired processing energy in a short time, and conversely, if the power density is lowered, the time for securing the processing energy becomes longer. However, if the power density is too high, damage (appearance distortion, etc.) of the base material film may occur depending on the kind of the base material film, and therefore, an appropriate range of power density can be selected in consideration of this. For example, in the case of a base material film having heat resistance or the like, the processing time required for securing the desired processing energy can be shortened by increasing the power density.

Furthermore, the processing energy upon the plasma discharge treatment can be maintained at about 2 $J/cm^2$ or more. The processing energy may be 3 $J/cm^2$ or more, 4 $J/cm^2$ or more, 5 $J/cm^2$ or more, 6 $J/cm^2$ or more, 7 $J/cm^2$ or more, 8 $J/cm^2$ or more, 9 $J/cm^2$ or more, 10 $J/cm^2$ or more, 11 $J/cm^2$ or more, or 12 $J/cm^2$ or more. The processing energy may be 30 $J/cm^2$ or less, 28 $J/cm^2$ or less, 26 $J/cm^2$ or less, 24 $J/cm^2$ or less, 22 $J/cm^2$ or less, 20 $J/cm^2$ or less, 18 $J/cm^2$ or less, 16 $J/cm^2$ or less, or 14 $J/cm^2$ or less, but is not limited thereto.

The specific range of the processing energy can be changed in consideration of the state of the barrier layer to be treated, for example, its thickness and the like. In general, the thicker the thickness, the more energy is needed for the reaction, so that the amount of processing energy can be increased. However, even when the thickness of the barrier layer becomes too thick as described above, damage such as cracks can be caused, so that the above processing energy can also be adjusted according to the appropriate thickness of the barrier layer.

The process pressure upon the plasma treatment can be maintained in a range of 50 mTorr or more. In another example, the process pressure may be about 60 mTorr or more, 70 mTorr or more, 80 mTorr or more, 90 mTorr or more, 100 mTorr or more, 150 mTorr or more, or 200 mTorr or more, or may be maintained in the range of about 500 mTorr or less, about 450 mTorr or less, about 400 mTorr or less, about 350 mTorr or less, or about 300 range of mTorr or less.

The temperature at which the plasma treatment is performed is not particularly limited, but it may be appropriate to perform at a temperature higher than room temperature because the reaction for formation of the barrier layer can be made smoother as the temperature rises. For example, the process temperature upon the modification treatment may be 30° C. or higher, 40° C. or higher, 50° C. or higher, 60° C. or higher, 70° C. or higher, or 80° C. or higher. In another example, the process temperature may be about 85° C. or higher, about 90° C. or higher, about 95° C. or higher, about 100° C. or higher, about 105° C. or higher, or about 110° C. or higher. The process temperature may be maintained at about 200° C. or lower, about 190° C. or lower, about 180° C. or lower, about 170° C. or lower, about 160° C. or lower, about 150° C. or lower, about 140° C. or lower, about 130° C. or lower, or about 120° C. or lower.

The process pressure and the process temperature may be adjusted in consideration of the desired barrier characteristics and/or process efficiency, and the like.

The plasma processing time can be appropriately adjusted so that the barrier layer can exhibit proper barrier characteristics, and for example, can be performed for a time of about 10 seconds to 10 minutes or so. However, the processing time is an example, and the specific processing time may be determined in accordance with the power density or the like depending on the level of the desired processing energy as described above.

The modified polysilazane layer having barrier characteristics can be formed by modifying the polysilazane layer with the modification treatment under the above conditions.

Also, the production method of the present application may further comprise a step of forming a surface layer on the polysilazane layer or the modified polysilazane layer before and/or after the modification treatment of the polysilazane layer, or forming the above-described undercoating layer on the base layer. The surface layer can function as a so-called dielectric layer and/or a protective layer.

The materials for forming the surface layer are not particularly limited, and for example, a suitable material may be selected from various materials used for forming the above-described undercoating layer. In addition, the method of forming a surface layer may also be adopted as a suitable method in consideration of the type of the material to be selected.

The barrier film of the present application formed in the above-described manner has excellent barrier characteristics and thus can be effectively used in various applications, such as packaging materials of foods or medicines, and the like, members for FPDs (flat panel displays) such as LCDs (Liquid Crystal Displays) or solar cells, substrates for electronic papers or OLEDs (Organic Light Emitting Diodes), or sealing films. Particularly, the barrier film formed in the above-described manner has excellent optical performances such as transparency and thus can be effectively used in optical devices such as various display devices or lighting devices.

Advantageous Effects

The present application can provide a barrier film having excellent barrier characteristics and optical performances, and a method for preparing the film. The barrier film produced by the method of the present application can be effectively used not only for packaging materials of as foods or medicines, and the like, but also for various applications, such as members for FPDs (flat panel displays) such as LCDs (Liquid Crystal Displays) or solar cells, substrates for electronic papers or OLEDs (Organic Light Emitting Diodes), or sealing films.

EXPLANATION OF REFERENCE NUMERALS

1000: barrier film
100: base layer
200: undercoating layer
300: barrier layer
400: protective coating layer
500: anti-blocking layer

MODE FOR INVENTION

Hereinafter, the preparation method of the present application will be described through Examples and Comparative Examples according to the present application, but the scope of the present application is not limited by the following examples.

Example 1. Preparation of Barrier Film (A1)

A barrier film having a structure as shown in FIG. 1 was prepared by the following method. An undercoating layer (intermediate layer) having a thickness of 900 nm was formed on a PET (poly(ethylene terephthalate)) having a thickness of 50 μm using an acrylate composition comprising 40 parts by weight of silica nanoparticles having a size of 10 to 15 nm (tris(2-hydroxyethyl)isocyanurate triacrylate (SR368):dipentaerythritol hexaacrylate (DPHA):pentaerythritol triacrylate (PETA)=2:1:7). Subsequently, a polysilazane composition prepared by adding 1 part by weight of dimethylethanolamine (DMEA) to a polysilazane solution (solvent: dibutyl ether) containing about 4 wt % of perhydropolysilazane, relative to 100 parts by weight of the solid content of perhydropolysilazane was coated on the undercoating layer using a Meyer bar, and maintained at 70° C. for 1 minute and at 130° C. for 2 minutes and dried to form a barrier layer having a thickness of about 165 nm.

The barrier layer was treated with a plasma discharge device using a Ti electrode and cured. At this time, argon gas was injected as a discharge gas through a water bubbler so that the ratio of the injection flow rates of discharge gas (Ar gas):reaction gas (O2):water vapor was 3:4:3 or so (discharge gas injection flow rate: 75 sccm, reaction gas injection flow rate: 100 sccm, and steam injection flow rate: 75 sccm). At this time, the process pressure was 250 mTorr, the temperature was 110° C., the applied power of the plasma treatment was 1094 W, and the process energy was about 20 J/cm$^2$. The plasma treatment time was about 3 minutes to 5 minutes or so.

Example 2—Preparation of Barrier Film (A2)

A barrier film was prepared in the same manner as in Example 1, except that the barrier layer was formed using a composition prepared by adding 2 parts by weight of dimethylethanolamine (DMEA) relative to 100 parts by weight of the solid content of perhydropolysilazane.

Example 3—Preparation of Barrier Film (A3)

A barrier film was prepared in the same manner as in Example 1, except that the barrier layer was formed using a composition prepared by adding 3 parts by weight of dimethylethanolamine (DMEA) relative to 100 parts by weight of the solid content of perhydropolysilazane.

Example 4—Preparation of Barrier Film (A4)

A barrier film was prepared in the same manner as in Example 1, except that the barrier layer was formed using a composition prepared by adding 1 part by weight of triethanolamine (TEA) instead of dimethylethanolamine (DMEA) relative to 100 parts by weight of the solid content of perhydropolysilazane.

Example 5—Preparation of Barrier Film (A5)

A barrier film was prepared in the same manner as in Example 1, except that the barrier layer was formed using a composition prepared by adding 2 parts by weight of triethanolamine (TEA) instead of dimethylethanolamine (DMEA) relative to 100 parts by weight of the solid content of perhydropolysilazane.

Example 6—Preparation of Barrier Film (A6)

A barrier film was prepared in the same manner as in Example 1, except that the barrier layer was formed using a composition prepared by adding 3 parts by weight of triethanolamine (TEA) instead of dimethylethanolamine (DMEA) relative to 100 parts by weight of the solid content of perhydropolysilazane.

Example 7—Preparation of Barrier Film (A7)

A barrier film was prepared in the same manner as in Example 1, except that the barrier layer was formed using a composition prepared by adding 3 parts by weight of diethylaminopropyltrimethoxysilane (DEAPTMS) relative to 100 parts by weight of the solid content of perhydropolysilazane.

Comparative Example 1—Preparation of Barrier Film (B1)

A barrier film was prepared in the same manner as in Example 1, except that no water vapor was injected upon the plasma treatment.

Comparative Example 2—Preparation of Barrier Film (B2)

A barrier film was prepared in the same manner as in Example 1, except that the amine catalyst (DMEA) was not added.

Experimental Example 1—Measurement of Water Vapor Transmission Rate of Barrier Film The water vapor transmission rates (WVTR, unit: mg/m$^2$/day) of the barrier films prepared according to Examples and Comparative Examples were evaluated by AQUATRAN 1 (Mocon) at 30° C. and 100% relative humidity and shown in Table 1 below.

TABLE 1

| | Example | | | | | | | Comparative Example | |
|---|---|---|---|---|---|---|---|---|---|
| | 1 | 2 | 3 | 4 | 5 | 6 | 7 | 1 | 2 |
| WVTR | 0.74 | <0.5 | <0.5 | <0.5 | <0.5 | 0.90 | 0.85 | 2.6 | 2.0 |

Experimental Example 2

The contents of elements in the thickness direction of the barrier layer in the barrier films of Example 3 and Comparative Example 2 were analyzed by the EDS line profile. The JEOL JEM-ARM200F Field Emission Transmission Electron Microscope equipped with Schottky Field emitter, STEM Cs corrector and Energy Dispersive X-Ray Spectrometer was used as the analyzer and analyzed at an accelerating voltage of 200 kV and resolution capability point resolution (0.19 mm) and line resolution (0.10 nm), where the conversion ratio of Si—N bond units to Si—O bond units was calculated in the region corresponding to ⅓ in the thickness direction of the barrier layer from the side of the barrier layer contacting the undercoating layer according to the following general formula.

Figure 4:
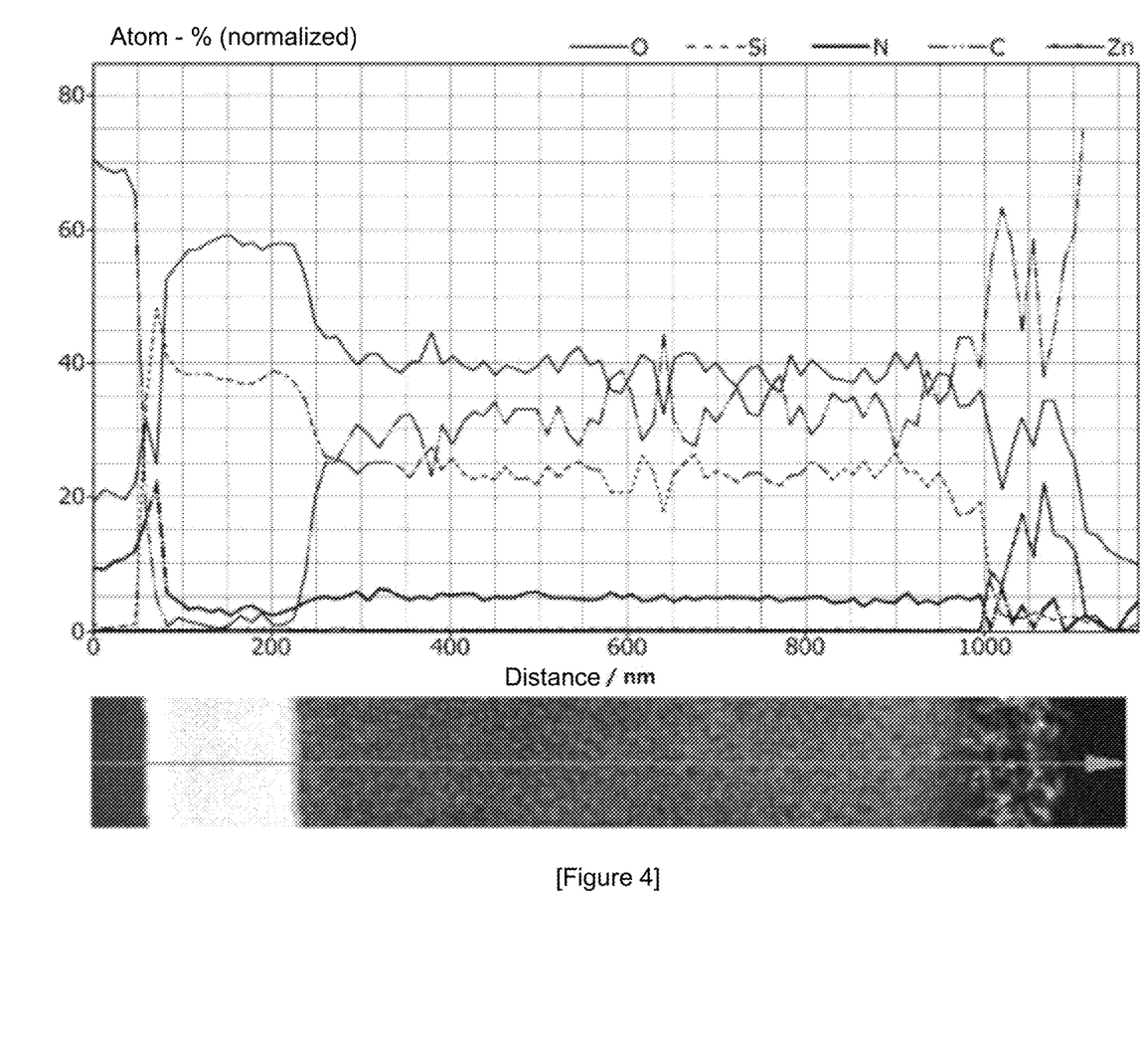
FIGS. 4 and 5 show element content changes in the thickness direction of the barrier layers of Example 3 and Comparative Example 2, respectively.
Figure 5:
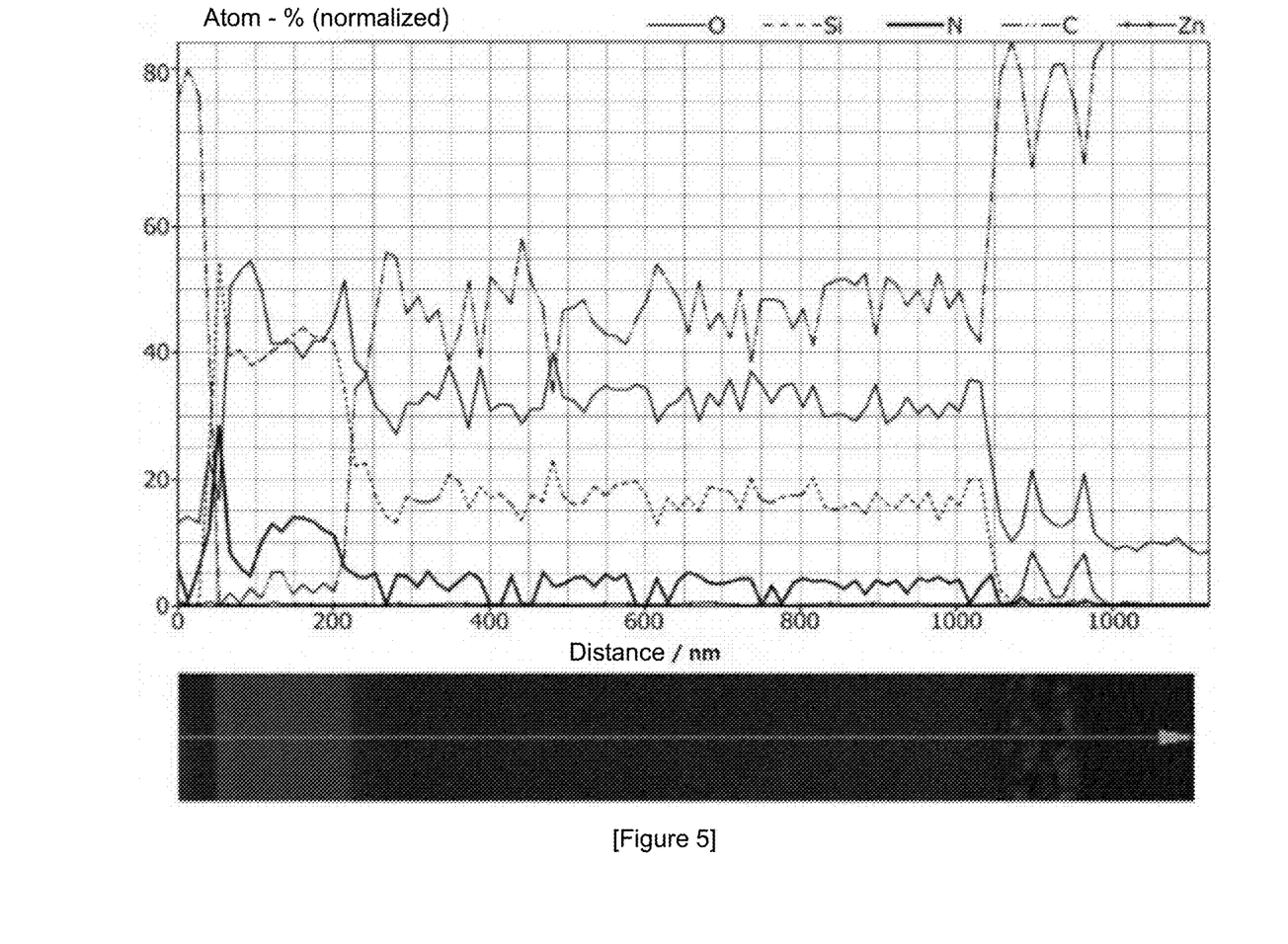

FIGS. 4 and 5 are the analysis results of the EDS line profile for Example 3 and Comparative Example 2, respectively. As a result of calculation, the corresponding value in Example 3 was 0.97, and the corresponding value in Comparative Example 2 was about 0.74. Through these results, it can be confirmed that the method of the present application can exhibit excellent barrier characteristics, since the conversion of polysilazane to Si—O is more effectively achieved.

$$b/(a+b) \qquad \text{[General Formula 1]}$$

In General Formula 1, a means the number of Si—N bond units existing in a region corresponding to ⅓ of the thickness of the barrier layer based on the side where the barrier layer contacts the undercoating layer, and b means the number of Si—O bond units existing in a region corresponding to ⅓ of the thickness of the barrier layer based on the side where the barrier layer contacts the undercoating layer.

The invention claimed is:

1. A method for preparing a water vapor transmission barrier film, the method comprising:
    coating a composition comprising an amine catalyst and a polysilazane on a base layer via a wet coating process to form a barrier layer, wherein:
        the amine catalyst is ammonia, ammonium hydroxide, ammonium chloride, trialkylamine, dialkylamine, monoalkyl amine, dialkanolamine, dialkylalkanolamine, trialkanolamine or dialkylaminoalkyl trialkoxysilane; and
        the amine catalyst is present in an amount within a range of 0.1 to 10 parts by weight relative to 100 parts by weight of the polysilazane; and
    subjecting the barrier layer to a curing process that includes performing a plasma hardening treatment comprising plasma-treating a surface of the barrier layer containing the polysilazane and the amine catalyst in a processing space in which water vapor, a discharge gas, and oxygen as a reaction gas are injected resulting in maintaining a vapor pressure of water vapor in the processing space at about 5% or more to cause oxidation of the polysilazane whereby SiN units of the polysilazane are converted into Si—O units in a thickness direction to layer satisfy Equation 2 below thereby yielding the water vapor transmission barrier film:

$$0.75 \leq d/(c+d) \leq 0.97 \qquad \text{[Equation 2]}$$

wherein:
    c is the number of Si—N units present in the barrier layer after the plasma hardening treatment, and
    d is the number of Si—O units present in the barrier layer after the plasma hardening treatment.

2. The method according to claim 1, wherein the polysilazane has a repeating unit of Formula 1:

[Formula 1]

wherein each of R$^1$, R$^2$ and R$^3$ separately is hydrogen, an alkyl group, an alkenyl group, an aryl group, a carbonyl group, a hydroxyl group or an alkoxy group.

3. The method according to claim 2, wherein R$^1$ to R$^3$ in the repeating unit of the Formula 1 are hydrogen atoms.

4. The method according to claim 1, wherein the polysilazane is present in an amount of 55 wt % or more.

5. The method according to claim 1, wherein the plasma-treating is carried out while maintaining a hydrogen partial pressure in the processing space at 2.00×10$^{-5}$ Pa or more.

6. The method according to claim 1, wherein a ratio (H/A) of an injection volumetric flow rate (H) of the water vapor to an injection volumetric flow rate (A) of the discharge gas is maintained at 0.4 or more.

7. The method according to claim 1, wherein a ratio (H/O) of an injection volumetric flow rate (H) of the water vapor to an injection volumetric flow rate (O) of the oxygen is maintained at 0.4 or more.

8. The method according to claim 1, wherein a process pressure during the plasma-treating is maintained at 50 mTorr or more.

9. The method according to claim 1, wherein a power density during the plasma-treating is maintained at 0.2 $W/cm^2$ or more.

10. The method according to claim 1, wherein a process energy density during the plasma-treating is maintained at 2 $J/cm^2$ or more.

11. The method according to claim 1, wherein the water vapor transmission barrier film further comprises an undercoating layer between the base layer and the barrier layer.

* * * * *